(12) United States Patent
Jeong et al.

(10) Patent No.: US 11,738,764 B2
(45) Date of Patent: Aug. 29, 2023

(54) APPARATUS AND METHOD FOR CONTROLLING PARKED VEHICLE USING CONNECTED SYSTEM

(71) Applicants: HYUNDAI MOTOR COMPANY, Seoul (KR); KIA MOTORS CORPORATION, Seoul (KR)

(72) Inventors: Sun Woo Jeong, Suwon-si (KR); Yong Joon Lee, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 173 days.

(21) Appl. No.: 16/919,627

(22) Filed: Jul. 2, 2020

(65) Prior Publication Data

US 2021/0039666 A1 Feb. 11, 2021

(30) Foreign Application Priority Data

Aug. 7, 2019 (KR) .......................... 10-2019-0096163

(51) Int. Cl.
  *B60W 50/12* (2012.01)
  *B62D 15/02* (2006.01)
  *B60W 40/105* (2012.01)
  *G06V 20/56* (2022.01)
  *B60W 50/00* (2006.01)

(52) U.S. Cl.
  CPC .......... *B60W 50/12* (2013.01); *B60W 40/105* (2013.01); *B62D 15/027* (2013.01); *G06V 20/588* (2022.01); *B60W 2050/0002* (2013.01); *B60W 2510/186* (2013.01); *B60W 2554/4029* (2020.02); *B60W 2554/4044* (2020.02)

(58) Field of Classification Search
  CPC ..... E04H 6/422; B60W 50/12; B60W 40/105; B60W 2050/0002; B60W 2510/186; B60W 2554/4029; B60W 2554/4044; B62D 15/027; G06V 20/588
  See application file for complete search history.

(56) References Cited

U.S. PATENT DOCUMENTS

| | | | |
|---|---|---|---|
| 2015/0039213 A1* | 2/2015 | Stefan | G08G 1/00 701/117 |
| 2015/0058101 A1* | 2/2015 | Han | G07B 15/02 705/13 |
| 2016/0075293 A1* | 3/2016 | Chun | H04W 4/14 701/2 |
| 2016/0202650 A1* | 7/2016 | Yoshida | G03G 15/80 399/88 |
| 2016/0313731 A1* | 10/2016 | Leppänen | B62D 15/0265 |
| 2017/0329346 A1* | 11/2017 | Latotzki | G08G 1/143 |
| 2018/0299904 A1* | 10/2018 | Harvey | G05D 1/0297 |

(Continued)

FOREIGN PATENT DOCUMENTS

KR 10-2017-0048285 A 5/2017

*Primary Examiner* — Kenneth J Malkowski
(74) *Attorney, Agent, or Firm* — Morgan, Lewis & Bockius LLP

(57) ABSTRACT

A method for controlling a parked vehicle includes receiving vehicle identification information from a first terminal, specifying a target vehicle to be controlled based on the vehicle identification information, waking up the target vehicle to be controlled and transitioning the target vehicle to be controlled to a movable state, and transmitting a moving direction to the target vehicle to be controlled.

9 Claims, 8 Drawing Sheets

(56) References Cited

U.S. PATENT DOCUMENTS

2019/0096259 A1\* 3/2019 McQuillen ............. G08G 1/168
2019/0113933 A1\* 4/2019 Ha ..................... B62D 15/0285
2019/0126765 A1\* 5/2019 Seo ...................... G05D 1/0225
2020/0086853 A1\* 3/2020 Kumar ............... B62D 15/0285

\* cited by examiner

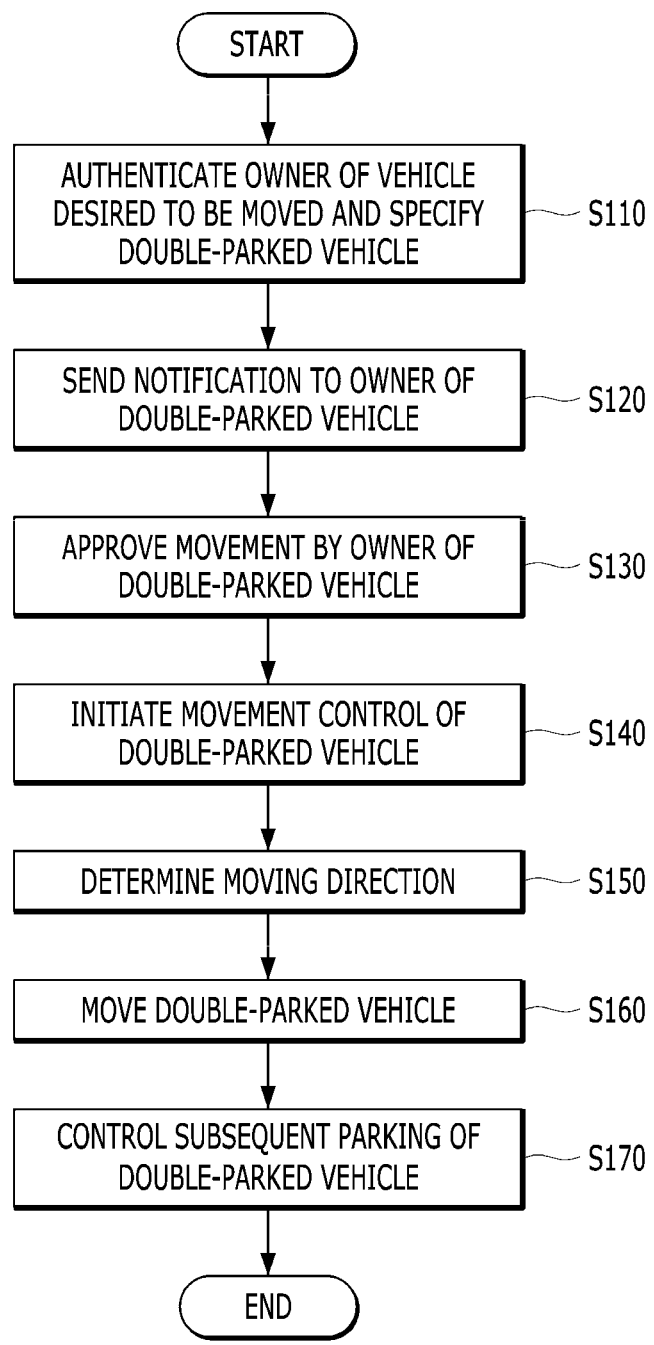

```
---------------- ALIGNMENT REFERENCE LINE
— · — · — · — SPACE WIDTH REFERENCE LINE
— — — — — — VEHICLE OUTLINE REFERENCE LINE
```

APPARATUS AND METHOD FOR CONTROLLING PARKED VEHICLE USING CONNECTED SYSTEM

CROSS-REFERENCE TO RELATED APPLICATION

This application claims the benefit of priority to Korean Patent Application No. 10-2019-0096163, filed on Aug. 7, 2019 in the Korean Intellectual Property Office, the entire disclosure of which is incorporated herein by reference.

TECHNICAL FIELD

The present disclosure relates to a method for controlling a parked vehicle using a connected system and an apparatus for executing the same.

BACKGROUND

In parking lots of public facilities or apartment complexes, vehicles are often double-parked due to lack of parking spaces, and in order to move a host vehicle parked in a parking space defined by parking lines, a transmission of the double-parked vehicle must be left in a neutral gear position in order for it to be possible to move the same. However, it may be difficult for an old or female driver to push a double-parked vehicle depending on the grade of the double-parked vehicle, and in the state in which the double-parked vehicle is be parallel to parking lines (i.e., bumper lines) or the double-parked vehicle is in a steered state, the double-parked vehicle may cause a contact accident with another parked vehicle due to movement. Further, it may be difficult to contact the driver of a double-parked vehicle when the transmission thereof has been left in a parking gear position (P).

Therefore, a method for safely and conveniently moving or parking a corresponding vehicle without requiring a driver of a double-parked vehicle to be present in a parking lot is required.

The information included in this Background section is only for enhancement of understanding of the general background of the present disclosure and may not be taken as an acknowledgement or any form of suggestion that this information forms the prior art already known to a person skilled in the art.

SUMMARY

The present disclosure is directed to an apparatus and method for controlling a parked vehicle using a connected system that substantially obviate one or more problems due to limitations and disadvantages of the related art.

An object of the present disclosure is to provide a method for controlling a parked vehicle using a connected system which may more conveniently move the parked vehicle, and an apparatus for executing the same.

Additional advantages, objects, and features of the disclosure will be set forth in part in the description which follows and in part will become apparent to those having ordinary skill in the art upon examination of the following, or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, a method for controlling movement of a parked vehicle includes receiving, by a server, vehicle identification information from a first terminal, specifying, by the server, a target vehicle to be controlled based on the vehicle identification information, waking up, by the server, the target vehicle to be controlled and transitioning the target vehicle to be controlled to a movable state, and transmitting, by the server, a moving direction to the target vehicle to be controlled.

In another aspect of the present disclosure, a method for controlling movement of a parked vehicle includes transitioning the parked vehicle to a movable state by receiving a wakeup command from a server, receiving a moving direction from the server, and moving the parked vehicle while sensing an obstacle on a moving path depending on the moving direction.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate exemplary embodiment(s) of the disclosure and together with the description serve to explain the principle of the disclosure. In the drawings:

FIG. 1 is a flowchart illustrating one example of a process for controlling movement of a parked vehicle using a connected system according to one exemplary embodiment of the present disclosure;

DETAILED DESCRIPTION

Figure 2A:
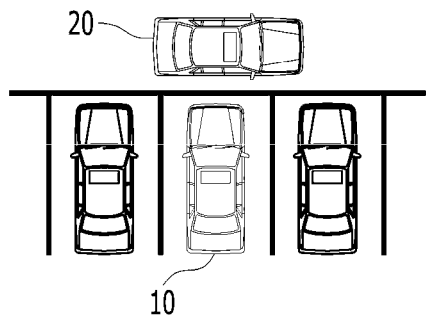
FIGS. 2A, 2B, 2C, 2D, 2E, and 2F are views illustrating one example of execution of control of movement of the parked vehicle according to one exemplary embodiment of the present disclosure.
Figure 2B:
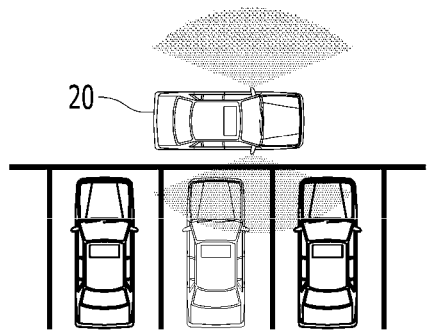

Reference will now be made in detail to exemplary embodiments of the present disclosure, examples of which are illustrated in the accompanying drawings. However, the disclosure of the disclosure is not limited to the exemplary embodiments set forth herein and may be variously modified. In the drawings, in order to clearly describe the present disclosure, descriptions of elements which are not related to the present disclosure are omitted, and the same or similar elements are denoted by the same reference numerals even when they are depicted in different drawings.

In the following description of the exemplary embodiments, it will be understood that, when a part "includes" an element, the part may further include other elements and does not exclude presence of such other elements, unless stated otherwise.

One exemplary embodiment of the present disclosure proposes that a target vehicle to be moved becomes in a movable state through user authentication and specifying of the target vehicle to be moved at the request of a user, so that the user may move the target vehicle to be moved without requiring an owner of the corresponding vehicle to directly drive the target vehicle to be moved.

For this purpose, a premise that is applied to the exemplary embodiments of the present disclosure will be described first.

For convenience, it is assumed that a "user" which will be described below is in a situation in which the user wants to remove his/her own vehicle, i.e., a "vehicle desired to be moved", parked in a parking space, from the parking space, but the vehicle desired to be moved is incapable of exiting the parking space due to a "double-parked vehicle" (i.e., a "target vehicle to be moved") which is double-parked on an exit path of the vehicle desired to be moved.

Further, it is assumed that the double-parked vehicle includes a sensing unit configured to sense at least obstacles around the double-parked vehicle, and includes a wireless communication system so as to execute wakeup and control at least some functions of the vehicle remotely. For example, the sensing unit may include an ultrasonic sensor, an around view monitor (AVM) system, an advanced driver assistance system (ADAS), etc., without being limited thereto. Further, the double-parked vehicle may include a remote smart parking assist (RSPA) system, which enables the vehicle to be parked remotely through control of a steering system and a driving system using the sensing unit.

Further, it is assumed that the user and an owner of the double-parked vehicle have already subscribed to the same connected service. Here, the subscription to the same connected service may mean that a service entity of the corresponding connected service has or possesses access authority for information for authentication of the user, and possesses remote connection and control authority for the double-parked vehicle or is in a state in which the service entity may acquire the remote connection and control authority for the double-parked vehicle from the owner of the double-parked vehicle. Although it is assumed that this service is provided through one server in the following description of the exemplary embodiments, this assumption is only exemplary and it will be apparent to those having ordinary skill in the art that this service may be implemented through cooperation between two or more servers.

FIG. 1 is a flowchart illustrating one example of a process for controlling movement of a parked vehicle using a connected system according to one exemplary embodiment of the present disclosure.

Referring to FIG. 1, in order to receive a vehicle movement control service, an owner of a vehicle to be moved, i.e., a user, may authenticate himself/herself on an entity providing the service, and enable the entity providing the service to specify a double-parked vehicle (S110). Authentication of the owner may be executed by executing personal authentication by connecting the owner to a server through a smart device (for example, a smart phone) possessed by the owner, and, if the owner has already subscribed to the service as a member, authentication of the owner may be executed through login using a dedicated application. The user may be connected to the service through a head unit provided in the user host vehicle (i.e., the vehicle desired to be moved).

Further, specifying of the double-parked vehicle may be executed by providing, by the user, identification information for identifying the double-parked vehicle to the entity providing the service (hereinafter, referred to as a "server") and looking up, by the server, membership information using the corresponding identification information. Provision of the identification information may be executed by transmitting an image of the license plate of the double-parked vehicle, taken by the user using the smart phone, inputting information of the license plate, or by photographing a QR code, which is obtained from the entity providing the corresponding service by an owner of the double-parked vehicle and is provided so as to be visible outside, but is not limited thereto.

When the server specifies the double-parked vehicle, the server may send a notification that the movement control service for the corresponding vehicle will be executed to the owner of the double-parked vehicle (S120). Here, the notification may include user-related information. The user-related information is information which is agreed to be provided to the owner of the double-parked vehicle according to the terms and conditions of the service, and may include the contact number, personal information, etc. of the user. The contact number may be provided in the form of a safety number using a one-time-use virtual number. Further, if the double-parked vehicle includes an AVM system, the server may acquire an image of the surroundings of the double-parked vehicle by activating the AVM system of the double-parked vehicle, and transmit the notification including the acquired image of the surroundings of the double-parked vehicle to the owner of the double-parked vehicle.

In response to the notification, the owner of the double-parked vehicle may approve whether or not the double-parked vehicle is to be moved (S130), and this operation (S130) may be omitted when the user agrees to responsibility in a predetermined range due to movement based on the terms and conditions of the service.

Depending on the approval by the owner of the double-parked vehicle or the agreement to the responsibility by the user, the server may wake up the double-parked vehicle, and remotely control the double-parked vehicle to become in a movable state (S140). Here, the movable state of the double-parked vehicle may mean in a narrow sense that a transmission of the double-parked vehicle is shifted from a parking gear position (P) to a neutral gear position (N), and, in this exemplary embodiment, may mean that an ADAS or an RSPA system of the double-parked vehicle is activated so that the double-parked vehicle becomes in an actively movable state.

When a moving direction of the double-parked vehicle in the movable state is determined (S150), the double-parked vehicle may be moved in the corresponding direction so as to enable the vehicle desired to be moved to exit a parking space (S160). Here, the moving direction may mean simply a forward direction or a backward direction, or include a maneuvering direction for obstacle avoidance through steering, depending on whether or not an obstacle is present.

Further, the moving direction may be determined by the user, be determined by the server through an AVN image of the double-parked vehicle, or be determined to be a direction for avoiding an obstacle through sensing of the obstacle by the double-parked vehicle, without being limited thereto.

When exit of the vehicle desired to be moved from the parking space has been completed, parking of the double-parked vehicle may be subsequently controlled (S170). Subsequent control of parking of the double-parked vehicle may include not only turning-off of an engine of the double-parked vehicle after shifting of the transmission to the neutral gear position (N) but also improvement in the double-parked state through alignment along parking lines or parking of the double-parked vehicle in the parking space in which the vehicle desired to be moved was parked using the RSPA system.

Hereinafter, the above-described process shown in FIG. 1 will be described in more detail with reference to FIGS. 2A to 2F. FIGS. 2A to 2F are views illustrating one example of execution of control of movement of a parked vehicle according to one exemplary embodiment of the present disclosure.

Referring to FIG. 2A, a vehicle 10 desired to be moved is normally parked within parking lines, but a double-parked vehicle 20 blocks the front of the vehicle 10 desired to be moved and thus the vehicle 10 desired to be moved is incapable of exiting a parking space defined by the parking lines.

Here, when a user, i.e., an owner of the vehicle 10 desired to be moved, authenticates himself/herself on the server and the server specifies the double-parked vehicle 20, the server may wake up the double-parked vehicle 20 and activate an AVM system of the double-parked vehicle 20. The double-parked vehicle 20 may transmit an AVM image to the server, and the server may transmit the corresponding image to a terminal of the user.

Figure 2C:
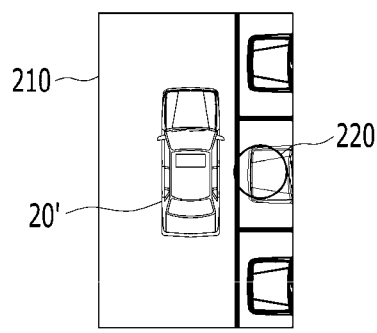

The user may select a position 220 of his/her own vehicle 10 which is blocked by the double-parked vehicle 20, in an image 210 displayed on the terminal, as shown in FIG. 2C. Thereby, the server may determine a moving direction of the double-parked vehicle 20 based on the position 220 selected by the user, or add an image, in which a designated visual effect is given to the position 220 selected by the user, to the notification described above in Operation S120 and transmit the notification including the image to a registered terminal of the owner of the double-parked vehicle.

Figure 2D:
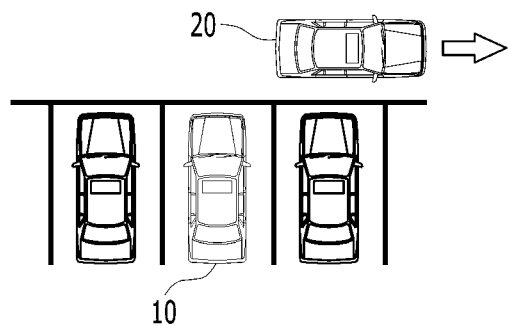
Figure 2E:
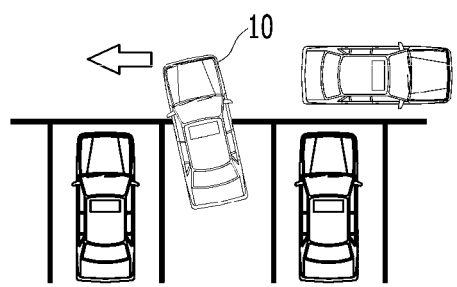
Figure 2F:
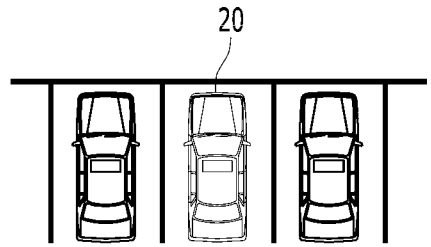

As the moving direction of the double-parked vehicle 20 is determined to be a forward direction, the double-parked vehicle 20 may be moved in the forward direction, as shown in FIG. 2D, and then the vehicle 10 desired to be moved may exit the parking space, as shown in FIG. 2E. Thereafter, the double-parked vehicle 20 may be moved to the position at which the vehicle 10 desired to be moved was parked, and then be parked at this position using an RSPA system, as shown in FIG. 2F, and an engine of the double-parked vehicle 20 may be turned off.

Hereinafter, Operations S110 to S140 shown in FIG. 1 will be described together with execution entities in more detail with reference to FIG. 3.

Figure 3:
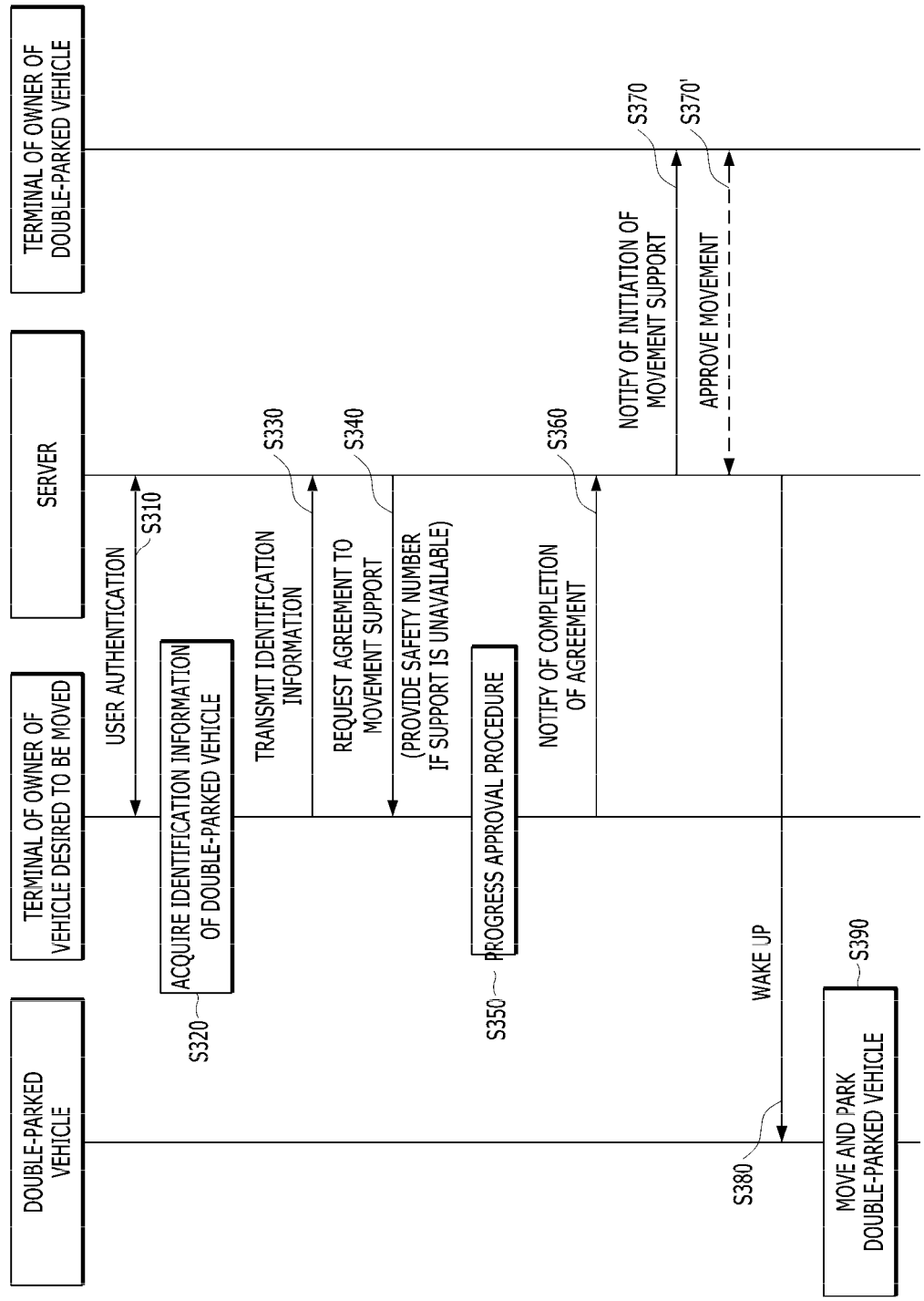
FIG. 3 is a diagram illustrating the process for controlling movement of the parked vehicle depending on execution entities according to one exemplary embodiment of the present disclosure.

FIG. 3 is a diagram illustrating the process for controlling movement of the parked vehicle depending on the execution entities according to one exemplary embodiment of the present disclosure.

Referring to FIG. 3, the owner of the vehicle desired to be moved, i.e., the user, executes user authentication with the server through his/her own terminal (S310). As described above, if the user has already subscribed to the corresponding service as a member, the user may execute authentication through login, and if the user is a nonmember, the user may execute authentication using a mobile phone or authentication using a credit card. For this purpose, the server may collect information for identifying an individual when the individual subscribes to the corresponding service, for example, the name, date of birth, resident registration number, mobile phone number, license plate number, vehicle identification number, vehicle release barcode information, credit card information, etc., encrypt the collected information, and store the encrypted information.

When user authentication has been normally completed, the user may acquire identification information of the double-parked vehicle through his/her own terminal (S320), and transmit the acquired identification information to the server (S330).

The server may specify the double-parked vehicle based on the received identification information, and identify the contact number of the owner of the double-parked vehicle connected to information of the specified vehicle. Further, the server may confirm whether or not the service is available by confirming a communication state with the double-parked vehicle.

Thereafter, the server may request an agreement to driver's responsibility for the vehicle movement (support) service (S340). If the server is incapable of communicating with the specified double-parked vehicle or is incapable of providing the service to the double-parked vehicle because the double-parked vehicle has no remote control function, the server may provide contact number information (for example, a safety number) of the owner of the double-parked vehicle to the user terminal.

In response to the request for agreement, the user may undergo an agreement procedure (S350), and the server may be notified of a result of agreement (S360). A detailed description of the agreement procedure will be given below referring to FIG. 4.

The terminal of the owner of the double-parked vehicle may be notified of initiation of the movement support service by user agreement (S370), and in some exemplary embodiments, the terminal of the owner of the double-parked vehicle may be accompanied by approval for movement by the owner of the double-parked vehicle (S370').

Depending on the user agreement or approval for movement by the owner of the double-parked vehicle, the server may wake up the double-parked vehicle so as to transition to the movable state (S380). Thereafter, the double-parked vehicle may be moved and parked (S390).

Figure 4:
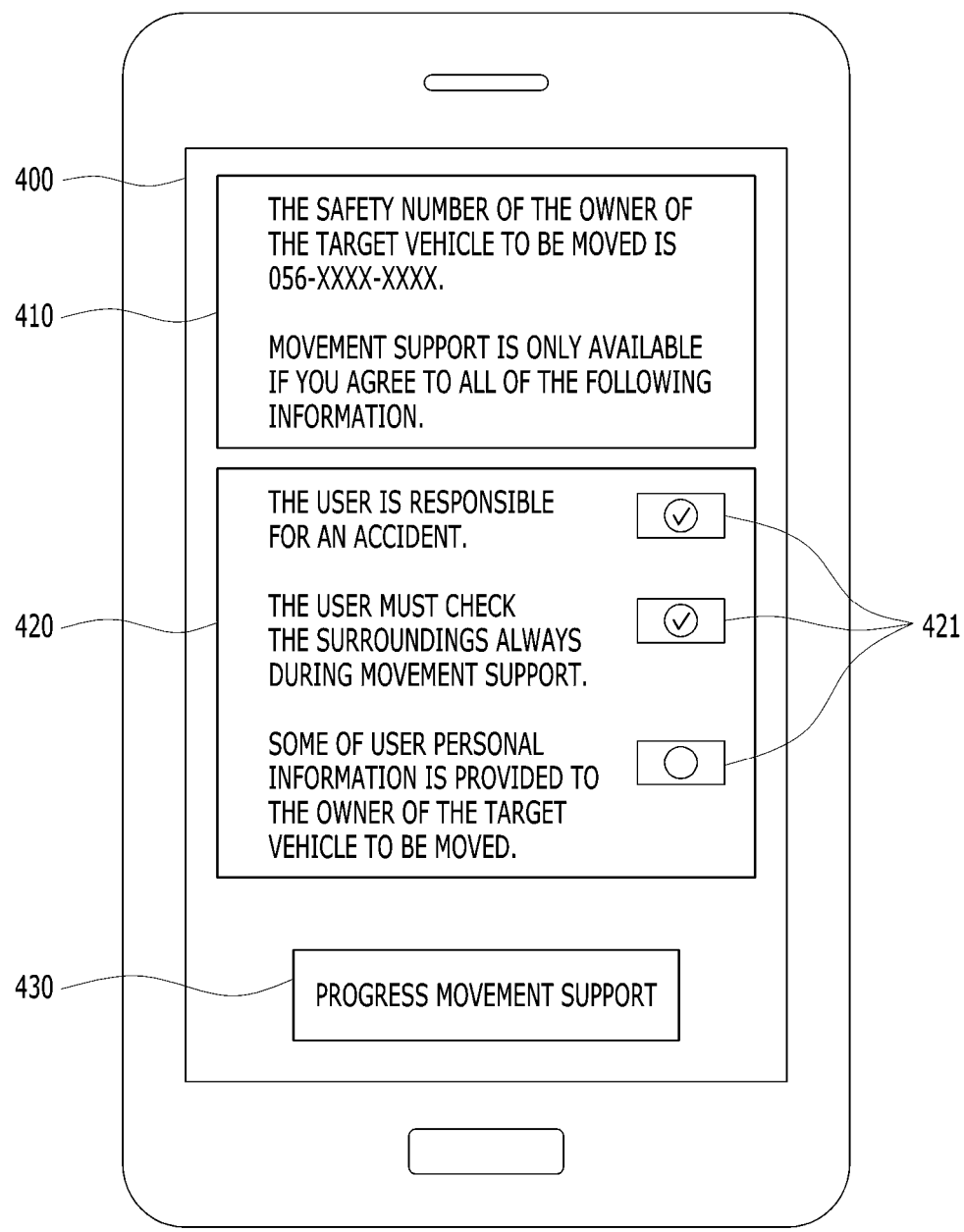
FIG. 4 is a view illustrating one example of execution of user agreement for controlling movement of the parked vehicle according to one exemplary embodiment of the present disclosure.

FIG. 4 is a view illustrating one example of execution of user agreement for controlling movement of the parked vehicle according to one exemplary embodiment of the present disclosure.

Referring to FIG. 4, when the server requests the agreement to driver's responsibility for the vehicle movement support service in Operation S340, a service agreement menu 400 may be displayed on the user terminal. The service agreement menu 400 may include information about the owner of the double-parked vehicle and agreement guidance 410, agreement details 420, and a final agreement button 430. Here, the final agreement button 430 may be configured to be activated only when all check boxes 421 of individual items of the agreement details 420 are selected. The configuration and details of the service agreement menu 400 shown in FIG. 4 are only exemplary, and the disclosure is not limited thereto.

Although the moving direction of the double-parked vehicle is determined by the user or the server, the double-parked vehicle may actively detect and avoid an obstacle so as to prevent an accident when moving in the determined direction. This will be described referring to FIG. 5 and FIGS. 6A to 6C.

Figure 5:
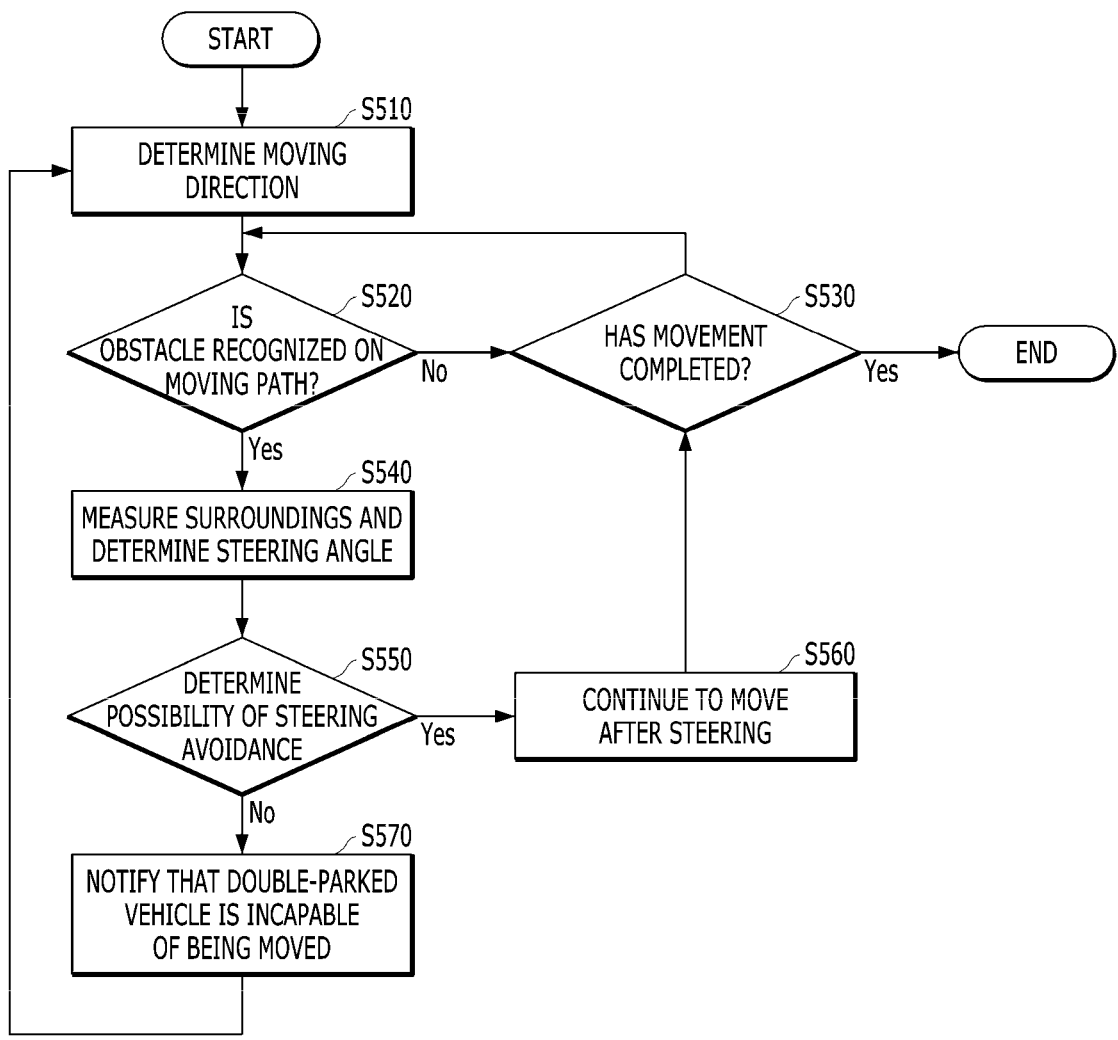
FIG. 5 is a flowchart illustrating one example of a process for moving the parked vehicle accompanied by steering avoidance according to one exemplary embodiment of the present disclosure.

FIG. 5 is a flowchart illustrating one example of a process for moving the parked vehicle accompanied by steering avoidance according to one exemplary embodiment of the present disclosure. In FIG. 5, it is assumed that the double-parked vehicle is already in the movable state due to having been woken up by the server.

Referring to FIG. 5, as the moving direction of the double-parked vehicle is determined, the double-parked vehicle may start moving in the corresponding direction (S510).

During movement, the double-parked vehicle monitors whether or not an obstacle is present on a moving path through an ultrasonic sensor, a vision sensor, the AVM system or a combination thereof (S520), and when no obstacle on the moving path is recognized (No in S520), the double-parked vehicle moves until the user notifies of completion of movement (S530).

On the other hand, when an obstacle on the moving path is recognized (Yes in S520), the double-parked vehicle may determine a position of the obstacle and a distance from the obstacle through measurement of the surroundings of the double-parked vehicle, and calculate an avoidance steering angle for avoiding the corresponding obstacle (S540). Here, in order to prevent collision with the obstacle, a point in time when the double-parked vehicle is stopped may be determined based on a braking distance matching the current speed of the double-parked vehicle, without being limited thereto.

The double-parked vehicle may determine a possibility of steering avoidance by comparing the maximum steering angle thereof with the avoidance steering angle (S550). Upon determining that steering avoidance is enabled (i.e., that the maximum steering angle is greater than the avoidance steering angle), the double-parked vehicle may continue to move after steering (S560).

On the other hand, upon determining that steering avoidance is not enabled, the double-parked vehicle notifies the server that the double-parked vehicle is incapable of being moved in the corresponding direction (S570), and stand by for a determination of another moving direction (S510).

The above-described process will be described in more detail with reference to FIGS. 6A to 6C.

Figure 6A:
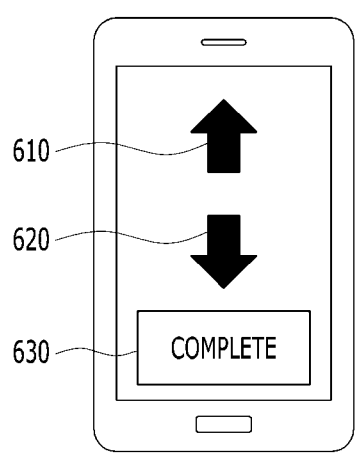
FIGS. 6A, 6B, and 6C are views illustrating one example of control of a moving direction of the parked vehicle according to one exemplary embodiment of the present disclosure.
Figure 6B:
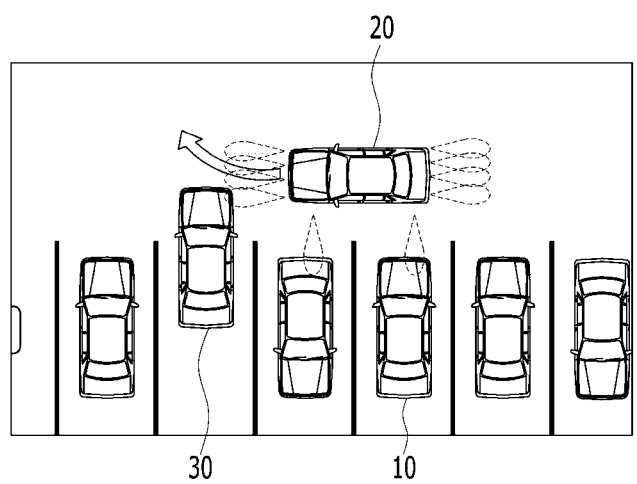
Figure 6C:
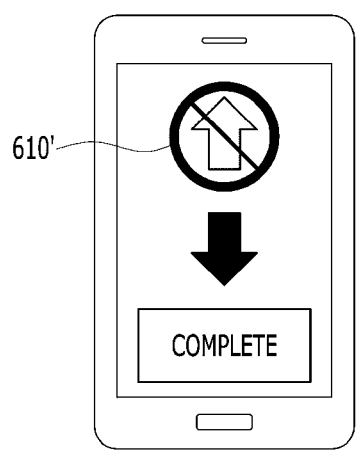

FIGS. 6A to 6C are views illustrating one example of control of a moving direction of the parked vehicle according to one exemplary embodiment of the present disclosure.

First, referring to FIG. 6A, after the agreement procedure, a menu for selecting the moving direction of the double-parked vehicle 20 may be displayed on the user terminal. A result of selection in the menu may be transmitted to the double-parked vehicle 20 via the server. In more detail, the menu may include a forward movement button 610, a backward movement button 620, and a completion button 630 for stopping movement of the double-parked vehicle when the double-parked vehicle 20 has been moved enough to enable a host vehicle to exit the packing space. Here, when the user operates the forward movement button 610, a result of the operation may be transmitted to the double-parked vehicle 20 via the server, and thereby, the double-parked vehicle 20 may move forwards. However, when another vehicle 30, which is parked in front of the double-parked vehicle 20, is sensed, as shown in FIG. 6B, and the double-parked vehicle 20 notifies the server that avoidance steering is not enabled, the server may notify the user terminal that avoidance steering is not enabled. Thereby, the forward movement button may be inactivated and indicated by an inactivation sign 610', as shown in FIG. 6C.

As described above, the movement of the double-parked vehicle according to the present disclosure may include improvement of alignment thereof. This will be described in more detail with reference to FIGS. 7A to 7C.

Figure 7A:
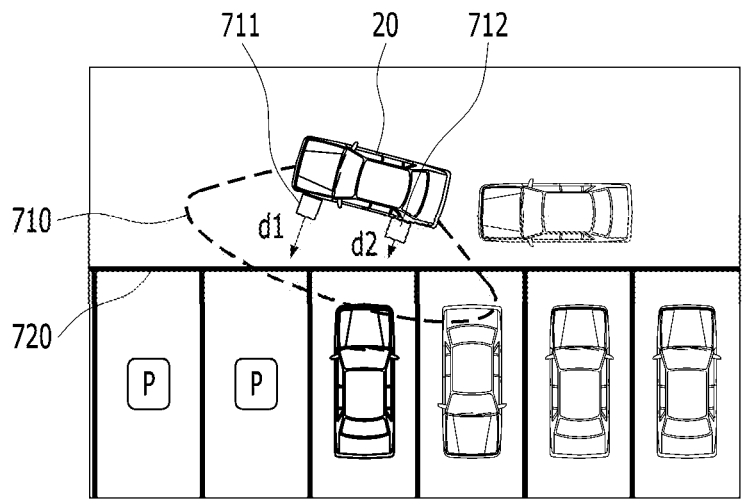
FIGS. 7A, 7B, and 7C are views illustrating one example of control of alignment of the parked vehicle according to one exemplary embodiment of the present disclosure.
Figure 7B:
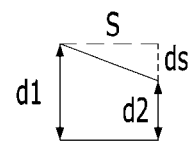
Figure 7C:
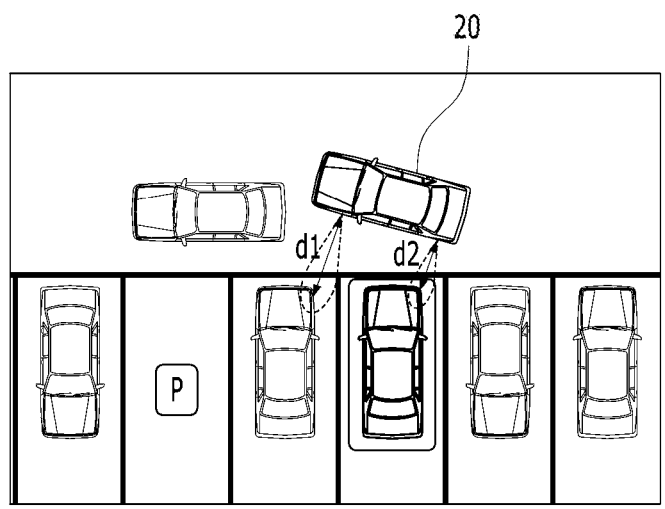

FIGS. 7A to 7C are views illustrating one example of control of alignment of the parked vehicle according to one exemplary embodiment of the present disclosure.

First, referring to FIG. 7A, the double-parked vehicle 20 may align itself with a parking line 720 parallel to bumper lines of parked vehicles based on an image 710 taken by one side camera of the AVM system. For this purpose, the double-parked vehicle 20 may measure distances d1 and d2 to the parking line 720 from two pixels 711 and 712 located at predetermined fixed positions in the corresponding image, and determine an alignment angle based on a distance difference. For example, the alignment angle $\tan^{-1}(ds/S)$ may be calculated using a distance S between the two pixels 711 and 712 in the length direction of the double-parked vehicle 20 and the difference ds between the distances d1 and d2 from the two pixels 711 and 712 to the parking line 720, as shown in FIG. 7B. Thereby, the double-parked vehicle 20 may move while being steered in a direction that offsets the corresponding angle.

If the double-parked vehicle 20 is not loaded with the AVM system or no parking lines parallel to bumper lines of vehicles are drawn in the parking lot, side ultrasonic sensors provided in a direction facing towards a parking space may be used, as shown in FIG. 7C. Specifically, the distance S between the two different pixels 711 and 712 in the length direction of the double-parked vehicle 20 may be replaced with a predetermined distance between a front left ultrasonic sensor and a rear left ultrasonic sensor, which is input in advance, and the distances d1 and d2 from the two pixels 711 and 712 to the parking line 720 may be replaced with distance values sensed by the respective ultrasonic sensors.

Next, movement of the double-parked vehicle to a position at which the vehicle desired to be moved was parked will be described with reference to FIGS. 8A to 8C.

Figure 8A:
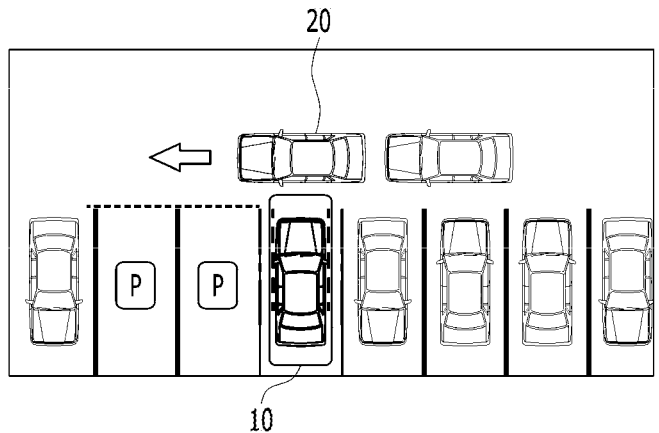
FIGS. 8A, 8B, and 8C are views illustrating one example of control of parking of the parked vehicle according to one exemplary embodiment of the present disclosure.
Figure 8B:
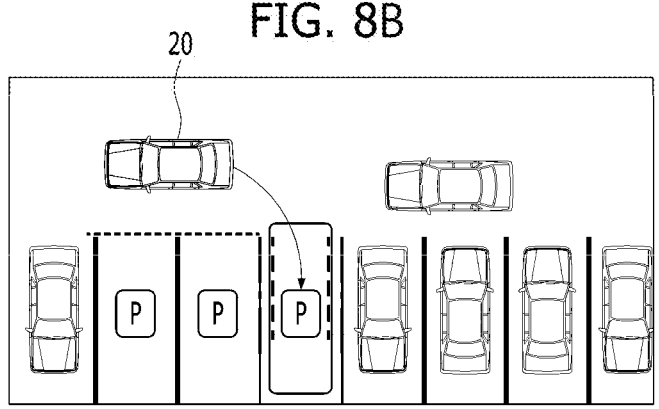
Figure 8C:
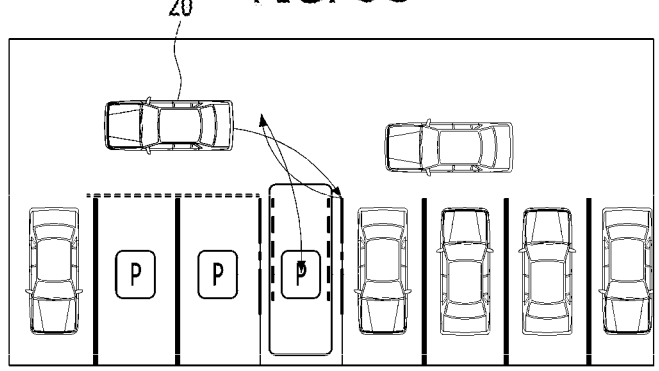

FIGS. 8A to 8C are views illustrating one example of control of parking of the parked vehicle according to one exemplary embodiment of the present disclosure.

Referring to FIG. 8A, as the double-parked vehicle moves, the double-parked vehicle 20 may extract an alignment reference line, space width reference lines, vehicle outline reference lines, etc. through various sensors. Here, the alignment reference line is a line which becomes a criterion of alignment so that the double-parked vehicle 20 may remain parallel to the alignment reference line when the double-parked vehicle 20 remains double-parked, and may be extracted through recognition of bumper lines or parking lines. The space width reference lines may be extracted through recognition of parking lines defining the parking space of the vehicle 10 desired to be moved before being moved, and an extension direction of the space width reference lines may become a reference direction of the parking direction of the double-parked vehicle 20. A distance between the space width reference lines may be compared with the width of the host vehicle, and thus be used to determine whether or not the host vehicle is capable of entering the parking space. Further, the vehicle outline reference lines may mean two lines which are spaced apart from each other by the width of the vehicle 10 desired to be moved, which actually occupied the parking space before being moved, and extend in the overall length direction of the vehicle 10 desired to be moved.

When information about the respective reference lines is acquired, the double-parked vehicle 20 may determine a manner of parking based on at least one of the information about the respective reference lines. For example, when the distance between the space width reference lines is greater than the width of the host vehicle, the double-parked vehicle 20 may determine to enter the parking space in which the vehicle 10 desired to be moved was parked, as shown in FIG. 8B. On the other hand, when the distance between the space width reference lines is less than the width of the host vehicle or when a margin is insufficient, the double-parked vehicle 20 may determine to double-park parallel to the alignment reference line again.

Prior to the determination as to whether or not the double-parked vehicle 20 is to enter the parking space, the double-parked vehicle 20 may confirm whether or not the vehicle 10 desired to be moved has completely exited the parking space, and may specify a parking position. For example, the double-parked vehicle 20 may confirm whether or not the vehicle 10 desired to be moved has completely exited the parking space using a rear sensor or a rear camera if the double-parked vehicle 20 moves forwards or using a front sensor or a front camera if the double-parked vehicle 20 moves backwards, and then specify the position at which the vehicle 10 desired to be moved was previously parked.

When the double-parked vehicle 20 determines to enter the parking space in which the vehicle 10 desired to be moved was previously parked, the double-parked vehicle 20 may determine the optimum entry path and then be parked based on at least one of the information about the respective reference lines, as shown in FIG. 8C.

The above-described method according to the present disclosure may be implemented as computer readable code in a computer readable recording medium in which programs are recorded. Such computer readable recording media may include all kinds of recording media in which data readable by computer systems is stored. As an example, the computer readable recording media may include a hard disk drive (HDD), a solid-state disk (SSD), a silicon disk drive (SDD), a ROM, a RAM, a CD-ROM, a magnetic tape, a floppy disk, an optical data storage device, etc.

As is apparent from the above description, in a method for controlling a parked vehicle using a connected system according to at least one exemplary embodiment of the present disclosure, the parked vehicle may be conveniently and safely moved through the connected system.

Particularly, in the method according to the at least one exemplary embodiment of the present disclosure, collision during movement may be prevented, a target vehicle to be moved may be aligned with a parking line, and be parked in a vacant parking space.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A method for controlling movement of a parked vehicle, the method comprising:
   executing, by a server, user authentication through a first terminal;
   receiving, by the server, vehicle identification information on a double-parked vehicle from the first terminal, wherein the vehicle identification information includes an image or information of a license plate of the doubled-parked vehicle, or a photographed QR code;
   specifying, by the server, the double-parked vehicle as a target vehicle to be controlled based on the vehicle identification information and transmitting, by the server, a request of agreement to responsibility to the first terminal;
   waking up, by the server, the target vehicle to be controlled and transitioning the target vehicle to be controlled to a movable state upon receiving the agreement to responsibility and an agreement completion notification for moving the target vehicle from the first terminal or an approval for movement of the target vehicle; and
   transmitting, by the server, a moving direction to the target vehicle to be controlled.

2. The method according to claim 1, wherein the transmitting of the request of agreement to responsibility to the first terminal includes:
   confirming, by the server, whether or not the specified target vehicle to be controlled is movable before the transmitting a responsibility agreement request; and
   transmitting the request of agreement to responsibility to the first terminal according to a result of the confirming.

3. The method according to claim 2, further comprising transmitting, by the server, contact number information of an owner of the target vehicle to be controlled to the first terminal.

4. The method according to claim 1, further comprising notifying, by the server, a second terminal relating to the specified target vehicle to be controlled that the specified target vehicle to be controlled is to be moved.

5. The method according to claim 4, wherein the notifying a second terminal that the specified target vehicle to be controlled is to be moved comprises:
   notifying the second terminal of at least one of user information of the first terminal or an image of surroundings around the target vehicle to be controlled, acquired by the target vehicle to be controlled.

6. The method according to claim 1, wherein the moving direction is determined by the server based on an image of surroundings around the target vehicle to be controlled, wherein the image is received by the server from the target vehicle to be controlled.

7. The method according to claim 1, wherein the moving direction is determined by the first terminal.

8. The method according to claim 1, wherein the moving direction is determined by at least one of the server based on an image of surroundings around the target vehicle to be controlled, wherein the image is received by the server from the target vehicle to be controlled, or the first terminal.

9. A non-statutory computer readable recording medium having recorded thereon a program to execute the method according to claim 1.

* * * * *